Aug. 23, 1955
H. K. DICE
2,716,024
APPARATUS FOR THE TREATMENT OF OXYGENATED COMPOUNDS
Original Filed Jan. 5, 1949
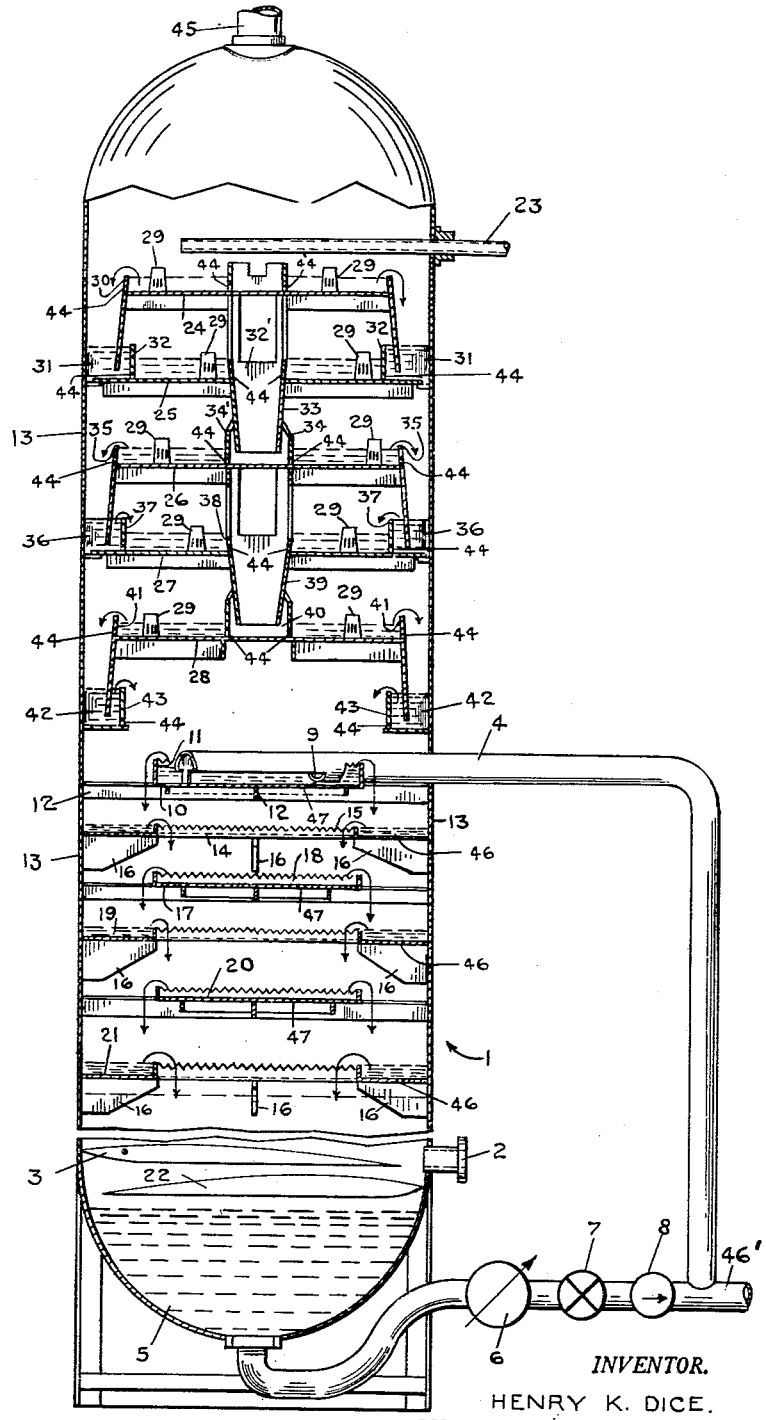
INVENTOR.
HENRY K. DICE.
BY
ATTORNEYS

United States Patent Office 2,716,024
Patented Aug. 23, 1955

2,716,024

APPARATUS FOR THE TREATMENT OF OXYGENATED COMPOUNDS

Henry K. Dice, Corpus Christi, Tex., assignor to Celanese Corporation of America, a corporation of Delaware Original application January 5, 1949, Serial No. 69,353, now Patent No. 2,570,215, dated October 9, 1951. Divided and this application April 27, 1951, Serial No. 223,315

1 Claim. (Cl. 261—11)

This invention relates to an improved apparatus for the treatment of a mixture of oxygenated organic compounds formed by the vapor phase partial oxidation of aliphatic hydrocarbons, whereby control of the oxidation reaction and a partial separation of the reaction products may be effected simultaneously.

This application is a division of my copending application S. No. 69,353, filed January 5, 1949, now Patent 2,570,215, patented October 9, 1951.

The vapor phase, partial oxidation of aliphatic hydrocarbons, such as propane or butane or mixtures thereof, employing air or oxygen as the oxidizing agent yields a complex mixture of products including formaldehyde, acetaldehyde, methanol, acetone, methyl ethyl ketone, tetrahydrofuran and various oxides. The oxidation is effected by mixing butane or propane with a predetermined amount of air or oxygen, heating the mixture to reaction temperature and allowing the resulting exothermic oxidation reaction to proceed to the desired degree. Since only partial oxidation is desired, the reaction temperature must be controlled within precise limits and then completely halted when the desired degree of oxidation has been effected. The halting of the reaction may be accomplished rapidly by lowering the temperature of the gaseous reaction mixture of oxygenated products to a point where the oxidation reaction will no longer be self-supporting, for example, by quenching the hot reaction gases with a stream of cool water. Upon quenching the gaseous reaction mixture, the product obtained comprises an aqueous solution of oxygenated organic compounds. This solution is then subjected to a complex purification process to separate it into its several components. At the temperatures to which the reaction gases are reduced during the quenching step, e. g. about 200 to 250° F., and under the pressure employed, the formaldehyde in the reaction mixture is found to be the most soluble of the several oxygenated compounds present. This is due to the fact that the vapor pressure of formaldehyde is lowered by the formation of methylene glycol in water solution so that the remaining components remain essentially uncondensed due to their greater relative volatility at the absorber temperature. For efficient operation, it is highly advantageous to effect at the quenching stage of the process as complete a separation of the formaldehyde as is possible.

An object of my invention is to provide an improved apparatus wherein the continuous aqueous quenching of the hot reaction gases may be effected together with the simultaneous absorption and separation of the formaldehyde present in the gaseous reaction mixture.

Other objects of this invention will appear from the following detailed description and the accompanying drawing.

I have now found that the vapor phase partial oxidation of hydrocarbons, such as propane or butane with oxygen or air at elevated temperature and pressure may be closely controlled to yield a maximum of valuable oxygenated organic compounds and the formaldehyde separated therefrom in an efficient manner if the hot gaseous reaction mixture formed as the product of the oxidation reaction is quenched, to reduce the temperature thereof below oxidation temperature, by being brought into contact with a continuously circulating counter-currently flowing cooled aqueous solution of formaldehyde whereby the major part of the formaldehyde present is removed, and the formaldehyde remaining in the uncondensed vapors, after said quenching step, is then stripped therefrom by extracting the vapors with fresh water. This improved result is obtained employing the novel apparatus of my invention.

My novel apparatus will now be described with reference to the accompanying drawing, the figure of which is a side elevational view, partly in section showing the novel apparatus of my invention for carrying out the quenching and formaldehyde separation.

Referring now to the drawing, the hot gaseous mixture of reaction products from the vapor phase partial oxidation of propane or butane is introduced into a vessel generally indicated by reference numeral 1 through a vapor inlet 2. The hot gases are deflected upwardly by the top surface of a baffle 3 where they are met by a plurality of cascading streams of cooled aqueous formaldehyde, which streams reduce the temperature of said gases sufficiently to halt further oxidation. The aqueous formaldehyde solution employed as the quench liquor is that formed by quenching and extracting the reaction gases previously passed through the system. The quench liquor is introduced into vessel 1 by means of a pipe 4, being withdrawn from the body of liquid 5 in the base of vessel 1. The hot quench liquid 5 is cooled by being passed through a cooler 6, a valve 7 and is then forced upwardly into vessel 1 through pipe 4, by a pump 8.

The end of pipe 4 is cut away, as shown, to form a slot 9 which acts to distribute the liquid substantially uniformly on a circular baffle 10 provided with a sawtooth lip or weir 11 for liquid holdup. Circular baffle 10 is supported by a pair of rectangular supporting bars 12 which cross each other at right angles, the ends of which are suitably welded, for example, so as to be integral with the shell 13 of vessel 1. The liquid pumped on to baffle 10 continuously overflows weir 11 except for the holdup liquid and cascades on to an annular baffle 14 which is open in the center and provided with a circumferential saw-tooth lip or weir 15 surrounding the central opening. Baffle 14 is supported by a plurality of brackets 16 integral with shell 13. The liquid, after baffle 14 is filled, overflows and cascades over weir 15, falling through the central opening on to another circular baffle 17 identical in structure with circular baffle 10. The liquid on baffle 17 pours over a saw-toothed lip or weir 18 integral with baffle 17 and down to another annular baffle 19 identical in structure with baffle 14. The liquid continues on its downward path over circular baffle 20 and annular baffle 21 and the tortuous path thus provided for the gaseous reaction vapors entering through inlet 2 enables the counter-currently flowing liquid stream to extract a major part of the formaldehyde therefrom. Baffle 20 is substantially identical in both structure and manner of support with baffles 10 and 17, and baffle 21 is substantially identical in structure and support with baffles 14 and 19. The cascading streams of cooled aqueous formaldehyde effectively quench the hot reaction gases and wash out substantially all of the water-soluble gaseous formaldehyde present therein. The hot aqueous formaldehyde solution resulting from both the extraction and heat exchange with the hot gases falls on to baffle 3 and, after flowing downward on to baffle 22 joins the body of hot liquid 5 in the base of vessel 1.

In order to ensure the complete absorption of the formaldehyde in the hot reaction gases, the unabsorbed gases then rise through a second absorption section where a very thorough and intimate mixing of the gases is effected with fresh water which enters vessel 1 through a water inlet pipe 23.

The upper absorption section comprises a series of horizontal trays 24, 26 and 28 alternating with horizontal trays 25 and 27, each of trays 24, 25, 26, 27 and 28 being provided with a plurality of bubble caps 29 of the usual design and construction. The structure provided is such that the pressure drop through the bubble caps is sufficiently low to insure intimate contact of the vapors moving upward with the water present on said bubble cap trays. Bubble caps 29 are shown on a greatly enlarged scale in the interest of clarity, the number of bubble caps per tray being, usually several hundred in number.

The fresh water feed coming in through pipe 23 falls on tray 24 and, as the liquid level on tray 24 builds up, the overflow passes over weirs 30, the overflow falling into liquid seals 31. The overflow from liquid seals 31 passes over weirs 32 and across bubble cap tray 25 passing over a weir 32' and through a liquid downcomer 33 to lower tray 26. Weirs 30 and 32 are not circular but are secants of the circular shell and liquid seals 31 are not interconnected but are independent, one liquid seal being on one side of tray 25 and the other liquid seal 31 being on the opposite side. Furthermore, weir 32' and downcomer 33 are rectangular in horizontal cross-section but may, of course, be of any convenient shape, such as for example, square or circular.

The liquid overflow passing through downcomer 33 builds up in a rectangular vapor trap 34 to form a liquid seal and the overflow from the seal passes over an open rectangular weir 34' and across tray 26. From tray 26 the liquid flows over weirs 35 and down into liquid seals 36 which are duplicates in structure of liquid seals 31. From liquid seals 36 the liquid flows over weirs 37, over a rectangular weir 38, down to tray 28 through a rectangular liquid downcomer 39 and into a vapor trap 40 which also forms a liquid seal. The flow of the liquid across tray 28 is the same as that across tray 26 and the overflow falls over weir 41 into liquid seals 42 from which it passes downward over weirs 43 and on to circular baffle 10. Liquid seals 42 are of a structure identical with liquid seals 31 and 36.

Since the vapors are forced up through bubble caps 29 on each of trays 24, 25, 26, 27 and 28 because of the liquid seals which prevent any bypassing of the vapors, a very thorough absorption of the formaldehyde in the fresh water feed is effected. A plurality of drain holes 44 of a relatively small diameter are provided for draining the several trays and liquid seals when the apparatus is off stream, as for cleaning and the like. Holes 44 are not large enough or sufficient in number to interfere with the pressure drop through the system to prevent efficient extraction of the vapors. The uncondensed vapors leave vessel 1 through a vapor outlet 45, and are collected in any suitable manner. A plurality of drain holes 46 are provided for draining baffles 14, 19 and 21 while drain holes 47 are provided for draining baffles 10, 17 and 20.

When bringing the novel apparatus of my invention into operation, a stream of fresh water is pumped into vessel 1 through inlet 23 and a water layer is built up on each of bubble cap trays 24, 25, 26, 27 and 28, the overflow pouring over the several weirs to form the desired liquid seals 31, 36 and 42. The water overflows weir 43 and cascades on to quench baffles 10, 14, 17, 20 and 21, a layer of liquid building up on each of said baffles, as shown. When the various trays, traps and baffles are filled with water and the base filled to the operating level, the mixture of hot reaction gases produced by the vapor phase partial oxidation of the hydrocarbons is then introduced into vessel 1 through vapor inlet 2. The gases are immediately quenched below reaction temperature on striking the cooled liquid passing over annular baffle 21 and through the water cascading down the baffles 20, 17, 14 and 10, respectively. Further oxidation is thus immediately halted and the major part of the formaldehyde is absorbed. The uncondensed reaction gases then pass up through the bubble caps 29 on each of the bubble cap trays 28, 27, 26, 25, and 24, respectively and the formaldehyde remaining in the uncondensed reaction vapors is absorbed in the water on said trays. Except for some methanol which is absorbed, the remaining uncondensed oxygenated organic compounds pass out of vessel 1 through vapor outlet 45.

In order to build up the concentration of formaldehyde in the body of liquid 5 to the desired degree, when starting up, fresh water feed through pipe 23 is halted for a short time and the liquid 5 is continuously withdrawn from vessel 1, passed through cooler 6 and continuously circulated through pipe 4 back into vessel 1 by means of pump 8 before a side stream is taken off. When the formaldehyde concentration in the circulating liquid is at the desired level, i. e. from about 5 to 25% by weight and, preferably, from about 10 to about 15% by weight, a side stream is continuously withdrawn through a line 46' and the fresh make-up feed in equivalent amount is then resumed and continuously introduced into vessel 1 through pipe 23.

My novel apparatus not only permits of the oxidation reaction to be controlled properly by the quenching step but also provides an efficient and economical means for separating the formaldehyde from the remaining oxygenated products in the form of a relatively concentrated solution with substantially no fouling of the system by tars, resins and like insoluble compounds formed during the initial vapor phase partial oxidation reaction.

It is to be understood that the foregoing detailed description is given merely by way of illustration and that many variations may be made therein without departing from the spirit of my invention.

Having described my invention, what I desire to secure by Letters Patent is:

An absorber adapted to be employed for selectively absorbing a hot vapor in a liquid medium passing counter-current to said vapor, comprising a shell having a plurality of inlets and outlets communicating therewith, including a single vapor inlet and a single vapor outlet, a plurality of liquid inlets and a single liquid outlet, said inlets and outlets being so spaced that the liquid and vapor in their respective counter-current paths traverse a substantial portion of the length of said shell, and means interposed between said several inlets and outlets to provide a tortuous path for the liquid and vapor flows, the upper portion of the tortuous path comprising a plurality of bubble cap trays and the lower portion comprising a plurality of ring and disc sections each provided with a sawtooth weir about the peripheral edge thereof for liquid holdup, the vapor inlet and liquid outlet being below the ring and disc sections and the vapor outlet being above the bubble cap trays, one liquid inlet being above the bubble cap trays and a second liquid inlet being above the ring and disc sections and below the bubble cap trays, said single liquid outlet comprising an outlet pipe leading from the bottom of the shell for withdrawing liquid having therein absorbed constituents of said hot vapor, which liquid has been heated by contact with said hot vapor, a cooler connected to said outlet pipe for cooling said withdrawn liquid, a branch pipe for directing a portion of said cooled liquid to said second liquid inlet, a second branch pipe for withdrawing a side stream of said cooled liquid, and a pump for forcing the liquid through said outlet pipe and said cooler and said branch pipes, and liquid seal means associated with each of said bubble cap trays to provide a downward path of liquid overflowing said trays, said means being adapted to hold up a portion of said liquid and form a liquid seal, the construction and arrangement of said liquid seal means being such that the liquid is caused to have a radial flow over said bubble cap trays and to leave one bubble cap tray peripherally thereof and to leave the next succeeding cap tray centrally thereof whereby the liquid travels in a downward direction through the bubble cap trays in a tortuous path.

References Cited in the file of this patent

UNITED STATES PATENTS

| | | |
|---|---|---|
| 591,138 | Mixer | Oct. 5, 1897 |
| 903,483 | Koppers | Nov. 10, 1908 |
| 1,780,563 | Messer | Nov. 4, 1930 |
| 1,868,618 | Wagner | July 26, 1932 |
| 2,204,771 | Rice et al. | June 18, 1940 |
| 2,254,370 | Kaplan | Sept. 2, 1941 |
| 2,494,337 | Hemminger | Jan. 10, 1950 |
| 2,558,222 | Parkinson | June 26, 1951 |

FOREIGN PATENTS

| | | |
|---|---|---|
| 1,644 | Great Britain | Apr. 27, 1877 |